Figure 1:
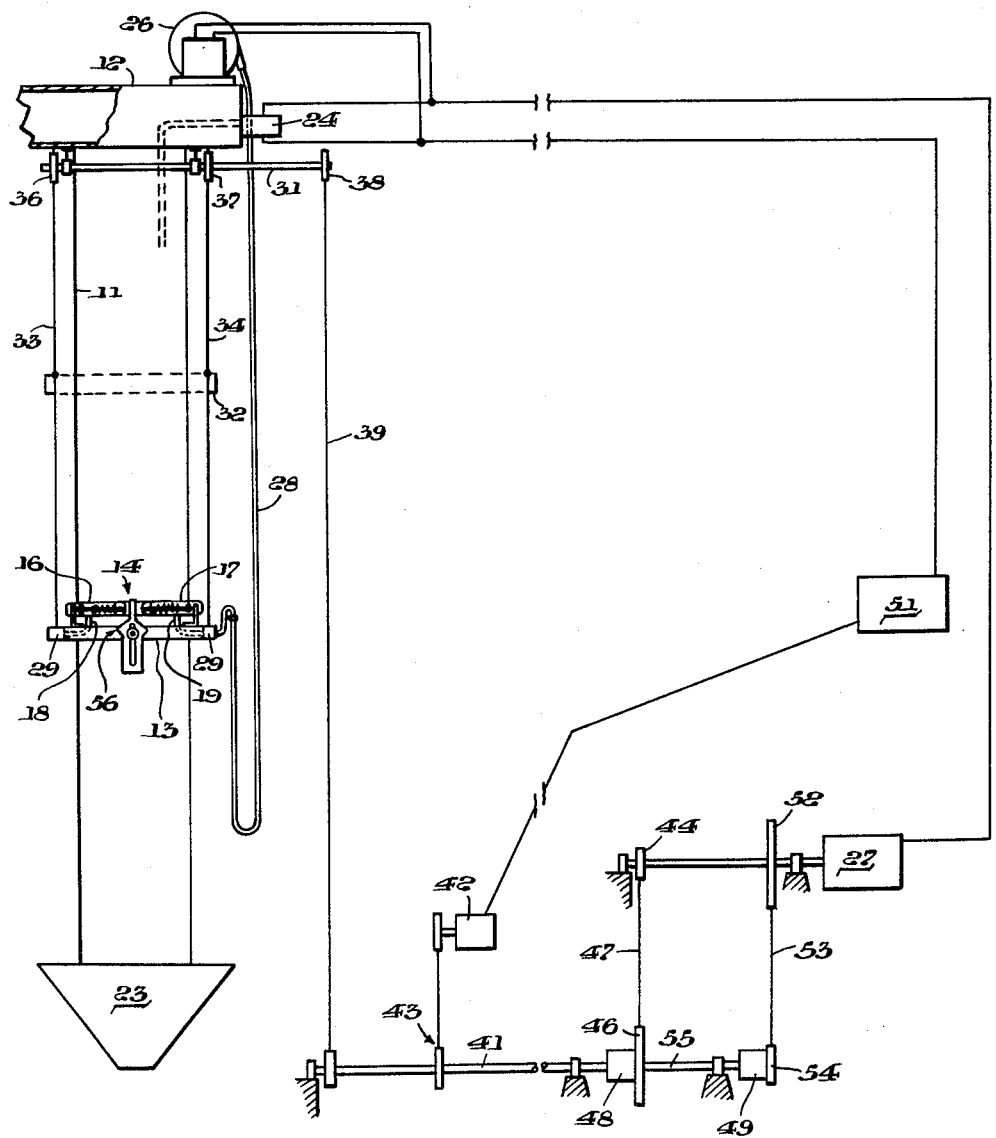

INVENTORS.
CARLOS S. SCHULTZ,
ROBERT J. W. WILLIAMS.
BY
their
ATTORNEY

INVENTORS.
CARLOS S. SCHULTZ,
ROBERT J. W. WILLIAMS.
BY
their
ATTORNEY.

April 6, 1965 C. S. SCHULTZ ETAL 3,176,449
REVERSE-JET TYPE DUST FILTER
Filed Dec. 6, 1961 4 Sheets-Sheet 3

INVENTORS
CARLOS S. SCHULTZ,
ROBERT J.W. WILLIAMS.
BY
Leo I. MaLossi.
their
ATTORNEY.

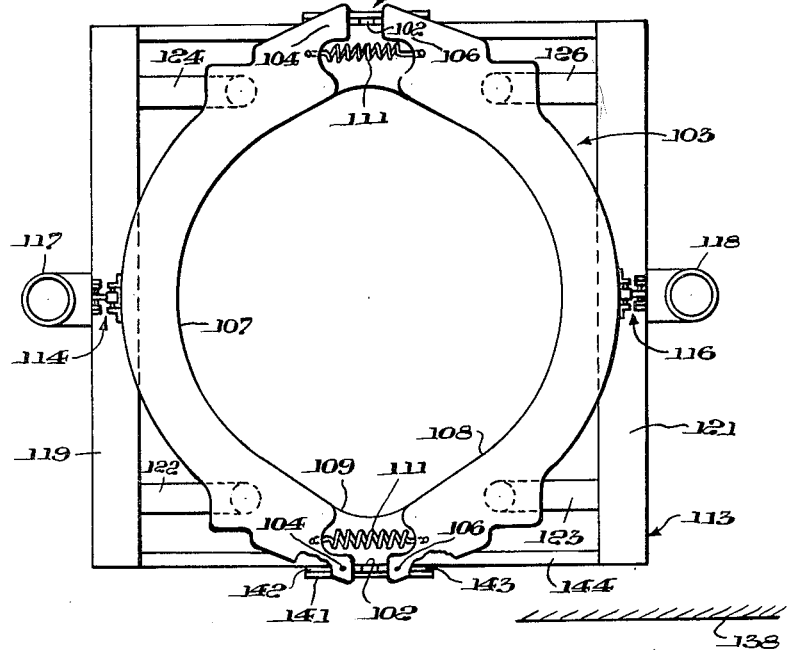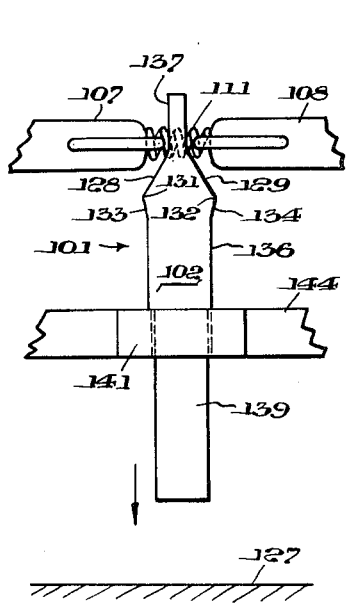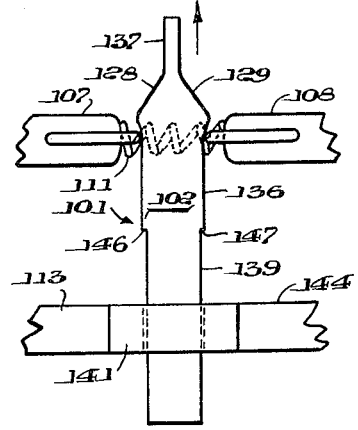

3,176,449
REVERSE-JET TYPE DUST FILTER
Carlos S. Schultz, Baltimore, and Robert J. W. Williams, Lutherville, Md., assignors, by mesne assignments, to Buffalo Forge Company, Buffalo, N.Y., a corporation of New York
Filed Dec. 6, 1961, Ser. No. 157,384
10 Claims. (Cl. 55—294)

This invention relates to an improved apparatus for cleaning the medium employed for filtering dust-laden gases, the cleaning being effected without interruption of the filtering operation by blowing a jet of relatively high-pressure gas through the filter medium in a direction reverse to the flow of the gas being filtered.

More particularly, the invention relates to an improvement of the mechanism for reciprocating the reverse-jet cleaning device relative to the filter medium and to means for controlling the extent of physical contact between the cleaning device and the filter medium.

It is therefore an object of the present invention to provide apparatus for greatly increasing the speed of the reverse-jet cleaning device on the "up" stroke thereby providing an increase in cleaning efficiency and, as a result thereof, an increase in the filtering efficiency for the same period of operation of the reverse-jet.

Another object of the present invention is to provide apparatus to so position the reverse-jet cleaning device as to eliminate physical contact between the device and the filter medium throughout the "up" stroke and then to reposition the device for the conventional "down" stroke during which the device remains in contact with the filter medium.

A further object of the present invention is the provision of apparatus for greatly increasing the speed of movement of the reverse-jet cleaning device during the "up" stroke relative to the speed thereof during the "down" stroke whereby equivalent filter efficiency may be provided with decreased reverse-jet "on" time.

According to the present invention mechanism for reciprocating the blow ring which encircles the cylindrical filter medium or bag is provided comprising means for moving the blow ring to a retracted position out of physical contact with the filter bag, means for moving the blow ring upward at a speed much greater than the conventional speed of the "up" stroke, means effective at the end of the "up" stroke for returning the blow ring into contact with the bag for the relatively slow-speed "down" stroke and means for controlling the movement of the blow ring in the downward direction during the "down" stroke in response to the pressure drop of the gases passing from inside to outside of the bag.

Figure 2:
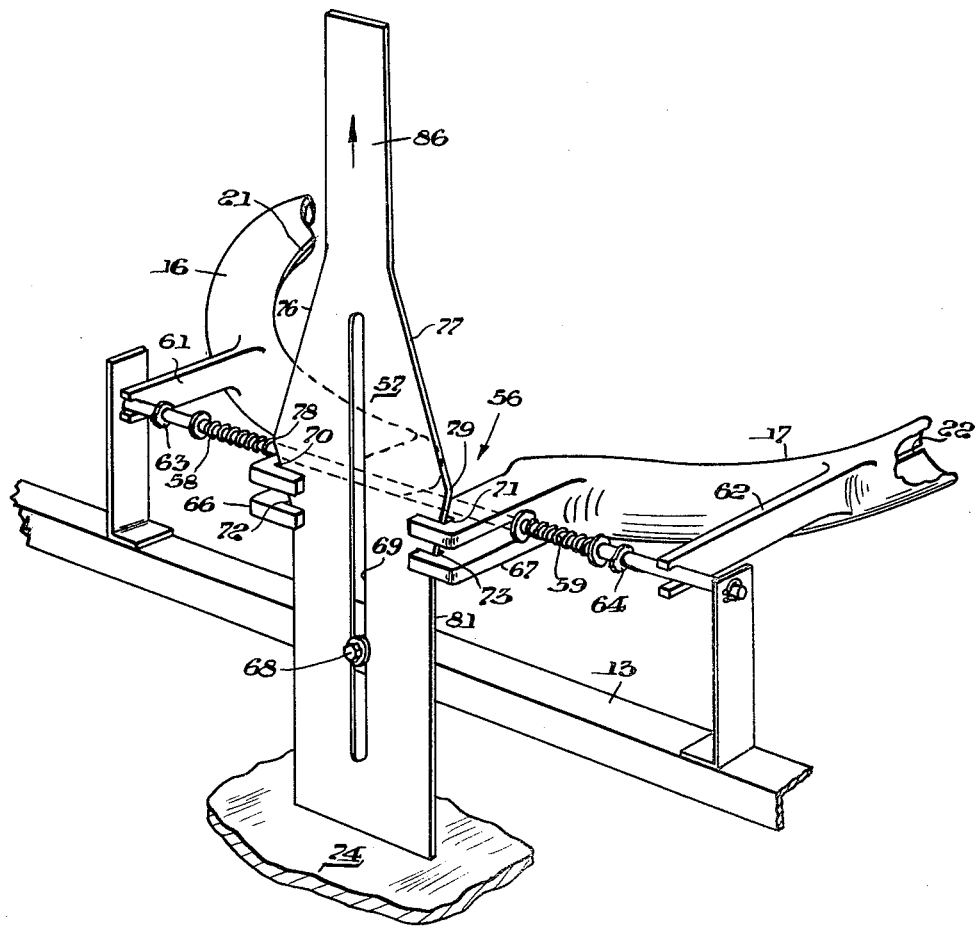
Figure 3:
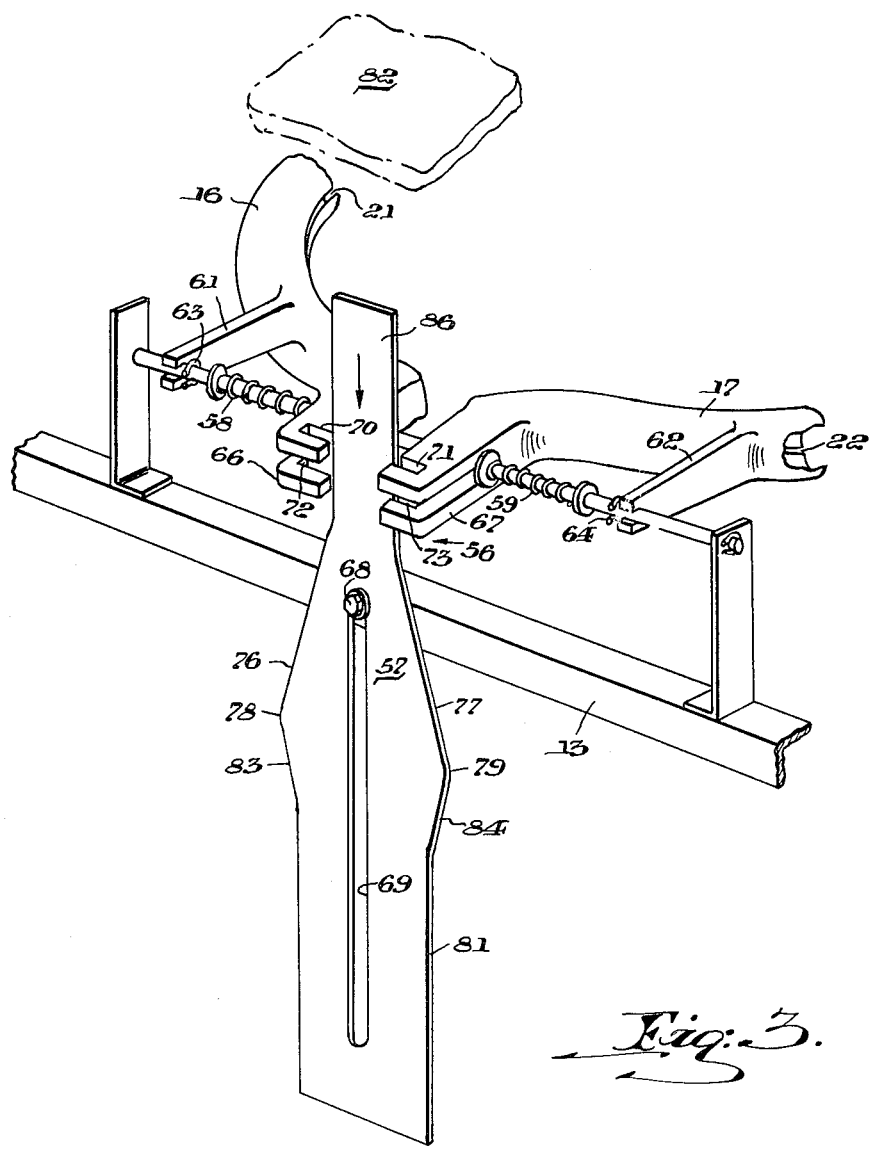

Other objects and many of the attendant advantages of this invention will be readily appreciated as the same becomes better understood by reference to the following detailed description when considered in connection with the accompanying drawings in which like reference numerals designate like parts throughout the figures thereof and wherein:

FIGURE 1 is a schematic representation of the operating mechanism for controlling the vertical reciprocation of the blow ring, FIGURE 2 is an isometric view of the preferred embodiment of the blow ring retraction device with the blow ring segments shown in retracted position for the "up" stroke, FIGURE 3 is an isometric view of the preferred embodiment of the blow ring retraction device with the blow ring segments shown in the position for normal engagement with the filter bag for execution of the "down" stroke, FIGURE 4 is a plan view of a second embodiment of the blow ring retraction device, FIGURE 5 is an elevational view of the second embodiment of the blow ring retraction device positioned in the bag engaging position employed during the "down" stroke and FIGURE 6 is an elevational view of the second embodiment of the blow ring retraction device positioned in the retracted position employed during the "up" stroke.

Reference to FIGURE 1 shows a cylindrical cloth filtering element or filter bag 11 into the top of which dust-laden gases are introduced through a pipe 12 or, in the case of multiple filter elements through a manifold. The dust-laden gas moves down through filter bag 11 and, due to the elevated pressure of this gas, it passes out through the fabric of the filter bag 11 from inside to outside. During the passage of this gas from inside to outside filter bag 11 a large percentage of the dust particles entrained therein are removed from the gas and remain in filter bag 11.

Along the outer periphery of filter bag 11 a carriage 13 is mounted for movement in a vertically reciprocating fashion. Mounted on carriage 13 is blow ring 14 which comprises a pair of semi-circular tubular, slotted segments 16 and 17 which in their effective blowing position contact the filter bag 11 depressing the bag inwardly to a slight degree at the point of contact. Blow ring elements 16 and 17 are provided with air under pressure by means of flexible pipes 18 and 19 and this air, after distribution to segments 16 and 17, is discharged through elongated orifices or slots 21 and 23 which slots extend substantially throughout the length of the inner surface of blow ring segments 16 and 17. This air being under pressure passes into the interior of filter bag 11 through the fabric thereof dislodging the dust particles from within the fabric and from the inner surface of filter bag 11. The dislodged dust particles then settle into hopper 23 from which they may be removed for appropriate disposition.

This action of blow ring 14 is cleaning filter bag 11 during its reciprocating action "up" and "down" outside bag 11 is called " reverse-jet action." The initiation or discontinuance of this action is controlled by pressure switch 24. As more and more dust particles are deposited on the inside of filter bag 11, the bag eventually becomes so thoroughly coated that the pressure drop of the gas as it passes through the bag from inside to outside becomes greater and greater. When it reaches a predetermined level, pressure switch 24 will make close electrical contacts therein (not shown) and start both reverse jet-blower 26 and two-speed reversible motor 27. Pressure switches able to serve in this capacity are commercially available, therefore additional description of pressure switch 24 would be superfluous.

As carriage 13 continues on its downward path the high pressure cleaning air supplied by blower 26 passes through hose 28 into manifold 29 in blow ring carriage 13 whence it is distributed to blow ring elements 16 and 17 through air supply pipes 18 and 19.

The cleaning air in forcing its way from without to within filter bag 11 does two things. First, it keeps open a sufficient number of the passageways through the fabric to maintain the desired degree of porosity. Second, it either breaks off the dust layer on the inner surface of the fabric or at least forces it to separate from the fabric sufficiently to open channels therebetween to permit the air being filtered to flow into the fabric itself.

When the pressure of the air within filter bag 11 drops below a predetermined value, about 4½ inches of water, pressure switch 24 opens and breaks the circuit to motor 27 and also to blower 26 thereby stopping both the progress of the carriage and the ejection of the cleaning air. In this manner the use of the cleaning air is restricted to those periods when the filter actually requires cleaning.

During the "down" stroke of the blow ring the carriage may be stopped and restarted two or three times during typical operation. It has been determined that on the "up" stroke, on the contrary, regardless of the speed under most operating conditions the reverse-jet system is unable to clean filter bag 11 well enough to cause pressure drop through the bag to be reduced to the prescribed 4½ inches of water required to actuate pressure switch 24 and stop the reverse-jet action.

These development tests have confirmed the fact that reverse-jet action during the "down" stroke is much more effective than during the "up" stroke over a wide range of flow ring travel speeds (20 to 70 feet per minute).

This is not to say, however, that the "up" stroke is totally ineffective. Tests have also shown that turning off the reverse-jet air during the "up" stroke results in higher average pressure drops through the filter medium than occur when reverse-jet action is used on the "up" stroke thereby indicating a decrease in filter performance.

The following table shows the results of testing wherein the flow of dust-laden gas through the filter was adjusted so that the reverse-jet action was "called for" by pressure switch 24 during approximately 30% of the total filter operating time. Since the reverse-jet action did not stop during the "up" stroke, the reverse-jet action remained on for 100% of each "up" stroke. In contrast thereto the reverse-jet action was stopped several times during each "down" stroke with the result that the reverse-jet "on" time during this stroke amounted to a relatively small percentage of the period required to complete the "down" stroke.

TABLE I

| Blow Ring Travel Speed (ft./min.) | Reverse-Jet Flow, c.f.m./ Blow Ring | Reverse-Jet "On" Time | | |
|---|---|---|---|---|
| | | Up Stroke, percent | Down Stroke, percent | Total Average, percent |
| 20 | 70 | 100 | 18 | 31 |
| 35 | 40 | 100 | 17 | 29 |
| 55 | 90 | 100 | 18 | 32 |
| 70 | 40 | 100 | 17 | 29 |

As a result of the above tests it was established that the "up" stroke has a detrimental effect on the overall filter performance, since it increases the total average reverse-jet "on" time.

In order to optimize this condition the present invention provides for a return greatly increasing the blow ring travel speed on the "up" stroke thereby transferring to the more efficient "down" stroke more of the less efficient reverse-jet cleaning time conventionally expended during the "up" stroke.

At the same time, both to facilitate a higher speed return and to produce the added advantage of decreased bag wear the blow ring segments 16 and 17 are moved to a retracted position at the bottom of the "down" stroke remaining in this retracted position until the blow ring 14 reaches the top of the "up" stroke.

As a result of the decreased period of contact between blow ring segments 16 and 17 and filter bag 11 and, further, as a result of the decreased reverse-jet "on" time, bag wear will be reduced by a factor of about 40%. Theoretically, it would be desirable to increase the "up" stroke speed to an infinitely great value, however, this is presently infeasible and the highest practical speed must be developed for each device. The minimum value for the "up" stroke speed is about twice the speed of the "down" stroke or 50 feet per minute whichever has the greater value.

If the speed during the "up" stroke is high enough, the increase in the pressure differential through the wall of filter bag 11 during this stroke due to the lack of reverse-jet cleaning action will be very small. With conventional low travel speeds in the order of 30 to 40 feet per minute used during the "up" stroke, the pressure differential through the wall of filter bag 11 increases to a very high level when reverse-jet cleaning is not used on the "up" stroke.

Since the cost of filter bags is very high, this improvement designed to increase the useful life of filter bags by eliminating physical contact between blow ring 14 and bag 11 will produce substantial savings in operating costs.

The apparatus for reciprocating blow ring carriage 13 in accordance with the present invention comprises conventional torsion shaft 31 from which is suspended blow carriage 13 and counterweight 32 by means of chains 33 and 34 and pulleys 36 and 37. Shaft 31 is rotatably driven through sprocket 38 and chain 39 by shaft 41 supported in suitable bearings. Rotary limit switch 42, type GSJ-2-1 (made by the Allen Bradley Company) is also driven by shaft 41 through a sprocket-chain combination 43 and serves to actuate electrical contacts at the top and at the bottom of the blow ring reciprocating strokes.

Shaft 41 is driven through a V-belt drive system by two-speed, reversible electric motor 27. During the "down" stroke motor 27 operates at its low speed and drives shaft 41 via sheaves 44 and 46, belt 47 and two-directional clutch 48. A suitable two-directional clutch is the REV-LOK clutch manufactured by Form Sprag Company of Warren, Michigan. The clutch 49 is of the conventional overrunning variety and overruns freely in this direction of rotation.

At the end of the low speed "down" stroke, motor 27 is reversed by reversing controller 51 in response to a signal from rotary limit switch 42. For the high speed "up" stroke motor 27 runs at high speed and drives shaft 41 via sheave 52, belt 53, sheave 54, overrunning clutch 49 and shaft 55 causing shaft 41 to rotate in this new direction.

The outer race of two-directional clutch 48 overruns freely and shaft 55 drives shaft 41 through the inner clutch portion. By properly selecting the motor speeds and the sheave sizes the desired speed for downward travel and the highest speed for upward travel of carriage 13 may be obtained.

In addition to providing the above-described change in direction and change in speed of reciprocation at the ends of the "up" and the "down" strokes, retraction device 56 is provided for moving the blow ring segments 16 and 17 either into retracted position or into physical contact with filter bag 11 as required.

As is shown in FIGURES 2 and 3, cam 57 slidably mounted on carriage 13 in conjunction with suitable guide means serves to move segments 16 and 17 into the retracted position or to permit springs 58 and 59 mounted on support rod 60 to bias segments 16 and 17 inwardly until support arms 61 and 62 movable along rod 60 reach snap lock rings 63 and 64. A duplicate retraction device 56, not shown, is provided diametrically opposite the retraction device shown to act upon the other ends of segments 16 and 17.

FIGURE 2 shows the position in which cam 57 is placed relative to bifurcated guide lugs 66 and 67 at the end of the "down" stroke preparatory to the execution of the high speed "up" stroke. As shown, cam 57 is slideably mounted on carriage 13 for free movement up and down relative thereto with limitations on the sideward movement of cam 57 being imposed by cam guide pin 68 in vertical slot 69 and guide slots 70, 71, 72 and 73 in bifurcated guide lugs 66 and 67.

When carriage 13 is close to the bottom of its "down" stroke, the cam 57 strikes the floor 74 of the filter unit as shown or some other fixed object. Therefore, the downward movement of cam 57 ceases, but carriage 13 continues to move in a downward direction to complete its stroke. The carriage 13 moves down relative to cam 57 and the portions of guide lugs 66 and 67 at the bottom of guide slots 72 and 73 strike the inclined edges 76 and 77 and cam 57 riding therealong during the continued downward movement of carriage 13.

Segments 16 and 17 are gradually forced apart against the biasing force of springs 58, 59 as guide lugs 66 and 67 ride down inclined edges 76 and 77 until the bifurcated guide lugs 66 and 67 pass over shoulders 78 and 79, move inwardly toward each other against the wide shank 81 of cam 57 and into the retracted position. As shown, wide shank 81 is slightly narrower than the distance between shoulders 78 and 79.

However, the width of wide shank 81 is sufficiently large so that retraction device 56 holds the blow ring segments 16 and 17 spaced apart from each other sufficiently far so that these segments would be out of physical contact with the largest standard bag 11. This consideration is necessary, since filter bags vary slightly in size when in use due to fabrication errors, the pressure within the bag, actual bag construction and the operating environment.

The elements of retraction device 56 retain their relative positions throughout the high speed "up" stroke until carriage 13 nears the top of its stroke, since wide shank 81 prevents springs 58 and 59 from moving segments 16 and 17 closer together and since the wider dimension between shoulders 78 and 79 prevents cam 57 from dropping under the force of gravity.

As the carriage nears the end of the "up" stroke, cam 57 strikes the ceiling 82 of the filter, or other fixed object, whereby upward movement of cam 57 is immediately halted. Carriage 13, however, continues to move up to complete its stroke and in so doing bifurcated guide lugs 66 and 67 are forced away from each other against the force of springs 58, 59 and then up relative to cam 57 along inclined sides 83 and 84 of cam 57 until these guide lugs have passed shoulders 78 and 79.

From this point on, guide lugs 66 and 67 (and thereby segments 16 and 17) move toward each other along sloping edges 76 and 77 under the bias of springs 58 and 59 until support arms 61 and 62 contact snap lock rings 63 and 64 fixing the inside diameter of blow ring 14. In this position guide lugs 66 and 67 remain far enough apart so as not to contact narrow shank 86 or receive any portion thereof within guide slots 70, 71, 72 or 73. Cam 57 will, of course, move down under the influence of gravity until cam guide pin 68 reaches the upper end of vertical slot 69. With the several elements of retraction device 56 in the relative positions as shown in FIGURE 3, blow ring segments 16 and 17 are placed in physical contact with filter bag 11 preparatory to executing the slow speed "down" stroke to clean collected dust from the inner surface and interstices of the fabric of filter bag 11 in the conventional manner.

A second embodiment of the retraction device employed in the present invention is shown in FIGURES 4, 5 and 6. Here the retraction device 101 consists of a cam 102 of modified configuration from that disclosed in the preferred embodiment together with a different means for guiding the vertical movement of cam 102.

Blow ring 103 is of the self-adjusting type with lugs 104 and 106 formed integral with blow ring segments 107 and 108. In this arrangement, blow ring segments 107 and 108 are biased inwardly into physical contact with filter bag 109 by springs 111. The mechanism for positioning blow ring segments 107 and 108 relative to carriage 113 are well known and are indicated schematically as the pivotal connections 114 and 116.

Compressed air from a blower, such as the blower 26 in FIGURE 1, passed through hoses 117 and 118 into manifolds 119 and 121 in the blow ring carriage 113 from whence this air is distributed to blow ring segments 107 and 108 through air supply tubing 122, 123, 124 and 126 from whence it is ejected through slots (not shown) similar to slots 21 and 22 in the preferred embodiment and in the manner described in connection therewith.

Since FIGURE 4 is a plan view of blow ring 103 and carriage 113 the relative positioning of the two retraction devices 101, 101 diametrically opposed relative to filter bag 109 is clearly shown. Similar relative positioning is employed in the case of retraction devices 56, 56 in the preferred embodiment.

The cleaning operation employing retraction device 101 is identical to the operation of the preferred embodiment and these embodiments differ only in structural detail. Near the bottom of the "down" stroke, cam 102 strikes the bottom 127 of the filter assembly or some other solid abutment to prevent further downward motion of cam 102. Blow ring carriage 113 and blow ring segments 107 and 108 mounted thereon continue to move downwardly to complete the "down" stroke. Lugs 104 and 106 strike inclined surfaces 128 and 129 and are moved further and further apart against the force of springs 111, 111 as blow ring segments 107 and 108 are moved downwardly relative to cam 102. As soon as lugs 104 and 106 have passed shoulders 131 and 132, continued downward motion of blow ring segments 107 and 108 cause lugs 104 and 106 to move inwardly along inclined surfaces 133 and 134 until they rest against wide shank 136 of cam 102. In this position, blow ring segments 107 and 108 re retracted from physical contact with filter bag 109 and remain so retracted during the high speed "up" stroke.

Near the end of the "up" stroke of carriage 113 and blow ring 103 as shown in FIGURE 6, narrow shank 137 forming the upper end of cam 102 strikes the ceiling 138 of the filter device or some other abutment. Carriage 113 in its continued upward motion forces lugs 104 and 106 to ride up inclined surfaces 133 and 134, past shoulders 131 and 132 and toward each other along inclined surfaces 128 and 129 under the force of springs 111 and 112 until these lugs reach a position relative to narrow shank 137 such as is shown in FIGURE 5. In this position segments 107 and 108 are urged into physical contact with bag 109 by springs 111, 111 as shown in FIGURE 4 for the slow speed "down" stroke.

Since cam 102 is no longer supported by lugs 104 and 105 as shown in the position shown in FIGURE 6, provision must be made to prevent cam 102 from falling to an inaccessible position. Also, provision must be made to properly align cam 102 for its vertical motion relative to carriage 113. These ends are achieved by providing reduced portion 139 of cam 102 and arranging this reduced portion 139 to pass through a slot bounded by member 141, spacers 142 and 143 (shown in cutaway portions of FIGURE 4) and framing member 144 forming part of carriage 113. By these expedients movement of cam 102 is limited to vertical movement relative to carriage 113 with shoulders 146 and 147 preventing cam 102 from dropping out of the device.

Springs 111, 111 must be properly selected to provide suitable positioning of self-adjusting blow rings segments 107 and 108 in physical contact with bag 109 for the "down" stroke, blow ring segments 107 and 108 being so positioned by springs 111, 111 that these segments are forced into good contact with filter bag 109 without contact between lugs 104, 106 and narrow shank 137 of cam 102.

Obviously many modifications of the present invention are possible in the light of the above teachings. It is therefore to be understood, that within the scope of the amended claims, the invention may be practiced otherwise than as specifically described.

We claim:

1. In a dust filter wherein a porous, flexible, cylindrical filter medium is employed for accumulating upon the inner side thereof solid particles from a dust-laden gas and wherein a reverse-jet cleaning device comprising a plurality of separate hollow curved sections mounted on a carriage and substantially encircling the filter medium is employed to dislodge the solid particles from the filter medium by ejecting a jet of pressurized fluid from without to within said filter medium through an orifice in each curved section while the reverse-jet cleaning device is reciprocated along the length of the filter medium, the improvement comprising means mounted on the carriage for moving said plurality of curved sections to a retracted position out of physical contact with said filter medium and means connected to said reverse-jet cleaning device for reciprocating said reverse-jet cleaning device with a high speed "up" stroke and a low speed "down" stroke.

2. In a dust filter the combination of a porous, flexible, cylindrical filter medium for accumulating upon the inner side thereof solid particles from a dust-laden gas, a reverse-jet cleaning device substantially encircling said filter medium comprising a plurality of separate hollow curved sections independently urged into normal working position in yielding engagement with the outer side of said filter medium on the "down" stroke, each of said sections having an orifice located in its inner periphery to direct a jet of pressurized fluid through said filter medium to dislodge accumulated solids from said inner side, means connected to said reverse-jet cleaning device for reciprocating said reverse-jet cleaning device relative to said filter medium at high speed on the "up" stroke and at low speed on the "down" stroke and means for retracting said plurality of curved sections from said normal working position for the "up" stroke.

3. In a dust filter, the combination set forth in claim 2, wherein the retracting means comprises an elongated cam supported on the reverse-jet cleaning device for vertical movement relative thereto and guide means formed on the curved sections adjacent said cam, said guide means and said elongated cam being in juxtaposition.

4. In a dust filter, the combination set forth in claim 2 wherein the retracting means comprises an elongated cam supported on the reverse-jet cleaning device for vertical movement relative thereto, guide means mounted on said reverse-jet cleaning device and engaging said cam and abutting means formed on the curved sections adjacent said cam.

5. In a dust filter the combination of a porous flexible cylindrical filter medium for accumulating upon the inner side thereof solid particles from a dust-laden gas, a reverse-jet cleaning device substantially encircling said filter medium comprising a plurality of separate hollow curved sections mounted on a carriage, means for independently urging said sections into yielding engagement with the outer side of said filter medium on the "down" stroke, each of said sections having an orifice therein in position to direct a jet of pressurized fluid through said filter medium to dislodge accumulated solids from said inner side, means connected to said reverse-jet cleaning device for reciprocating said reverse-jet cleaning device relative to said filter medium at high speed on the "up" stroke and at low speed on the "down" stroke, an elongated member mounted on said carriage and vertically movable relative thereto, abutment portions formed on said curved sections in juxtaposition with said elongated member, first means formed on said elongated member for coacting with said abutment portions to retract said plurality of curved sections to a position out of physical contact with said filter medium against the force of said urging means at the end of the "down" stroke, second means formed on said elongated member for coacting with said abutment member to retain said plurality of curved sections in retracted position during the "up" stroke and third means formed on said elongated member for coacting with said abutment means to release said plurality of curved sections from the retracted position at the end of the "up" stroke.

6. In a dust filter the combination of a porous flexible cylindrical filter medium for accumulating upon the inner side thereof solid particles from a dust-laden gas, a reverse-jet cleaning device substantially encircling said filter medium comprising a plurality of separate hollow curved sections mounted on a carriage, means for independently urging said sections into yielding engagement with the outer side of said filter medium on the "down" stroke, each of said sections having an orifice therein in position to direct a jet of pressurized fluid through said filter medium to dislodge accumulated solids from said inner side, motor means connected to said reverse-jet cleaning device for reciprocating said reverse-jet cleaning device relative to said filter medium at high speed on the "up" stroke and at low speed on the "down" stroke, pressure-sensitive means connected to said motor means and in communication with the zone within the filter medium for energizing and deenergizing said motor means in response to changes in pressure within said zone, an elongated member mounted on said carriage and vertically movable relative thereto, abutment portions formed on said curved sections in juxtaposition with said elongated member, first means formed on said elongated member for coacting with said abutment portions to retract said plurality of curved sections to a position out of physical contact with said filter medium against the force of said urging means at the end of the "down" stroke, second means formed on said elongated member for coacting with said abutment member to retain said plurality of curved sections in retracted position during the "up" stroke and third means formed on said elongated member for releasing said plurality of curved sections from the retracted position at the end of the "up" stroke.

7. In a dust filter the combination of a porous flexible hollow elongated filter medium for accumulating on the inner side thereof solid particles from a dust laden gas, a reverse jet cleaning device located proximate the outer surface of said elongated filter medium and including a plurality of hollow sections, means locating said hollow sections in a first spaced relationship to provide a normal working position relative to said outer surface of said elongated filter medium, means for supplying said pressurized fluid to said hollow sections, said hollow sections having orifices for directing jets of pressurized fluid toward said outer surface of said elongated filter medium to dislodge said accumulated solids from said inner surface while said hollow sections are in said normal working position, means connected to said reverse jet cleaning device for moving said hollow sections axially of said elongated filter medium at a low speed in one direction of travel when said hollow sections are in said normal working position and at a high speed in the opposite direction, and means for providing a second spacing between said hollow sections during travel of said hollow sections in said opposite direction, said second spacing being greater than said first spacing to thereby reduce wear of said flexible hollow elongated filter medium during travel of said hollow sections in said opposite direction.

8. In a dust filter the combination of a porous flexible elongated filter medium having an inner surface for accumulating solid particles thereon from a dust laden gas and an outer surface on the opposite side of said filter medium from said inner surface, a reverse jet cleaning device including hollow section means, means locating said hollow section means in a first position relative to said outer surface of said filter medium to provide a normal working position, means for supplying pressurized fluid to said hollow section means, orifice means in said hollow section means for directing a jet of pressurized fluid toward said outer surface of said elongated filter medium to dislodge said accumulated solids from said inner surface while said hollow section means is in said normal working position, means connected to said reverse jet cleaning device for moving said hollow section means along said outer surface of said elongated filter medium at a low speed in one direction when said hollow section means is in said normal working position and at a high speed in the opposite direction, and means for causing said hollow section means to occupy a second position relative to said outer surface of said filter medium during travel of said hollow section means in said opposite direction, said second position providing a greater spacing between said hollow section means and said outer surface of said filter medium than said first position to thereby reduce wear of said filter medium during travel of said hollow section means in said opposite direction.

9. In a dust filter the combination of a porous flexible filter medium having an inner surface for accumulating solid particles thereon from a dust laden gas and an outer surface on the opposite side of said filter medium from said inner surface, a reverse jet cleaning device including hollow section means, means locating said hollow section means in a first position relative to said outer surface of said filter medium to provide a normal working position, means for supplying pressurized fluid to said hollow section means, orifice means in said hollow section means for directing pressurized fluid toward said outer surface of said filter medium to dislodge said accumulated solids from said inner surface while said hollow section means is in said normal working position, means for causing said hollow section means to move along said outer surface of said filter medium in a first direction when said hollow section means is in said normal working position, means for causing said hollow section means to move in a second direction which is opposite to said first direction, and means for causing said hollow section means to occupy a second position relative to said outer surface of said filter medium during travel of said hollow section means in said second direction, said second position providing a greater spacing between said hollow section means and said outer surface of said filter medium than said first position to thereby reduce wear of said filter medium during travel of said hollow section means in said second direction.

10. A reverse jet cleaning device comprising a carriage including a frame, a plurality of hollow sections for substantially encircling an elongated filter medium, means for mounting said plurality of hollow sections on said frame, means forming a part of said mounting means for guiding said hollow sections toward and away from each other, conduit means in communication with each of said hollow sections for permitting compressed air to be supplied thereto, orifice means in said hollow sections for directing said compressed air emanating from said sections toward said elongated filter medium, first means operatively associated with said hollow sections for providing a first spacing therebetween, and second means operatively associated with said hollow sections for providing a second spacing therebetween which is greater than said first spacing, said first spacing being utilized when said hollow sections are in a cleaning position and said carriage is being moved in a first direction, and said second spacing being utilized to reduce wear on said filter medium when said carriage is moved relative to said elongated filter medium in a second direction which is opposite to said first direction.

References Cited by the Examiner
UNITED STATES PATENTS 2,551,126  5/51  Hersey _____ 55—294
2,729,304  1/56  Swanson _____ 55—294

HARRY B. THORNTON, *Primary Examiner.*

HERBERT L. MARTIN, *Examiner.*

UNITED STATES PATENT OFFICE
CERTIFICATE OF CORRECTION

Patent No. 3,176,449                      April 6, 1965

Carlos S. Schultz et al.

It is hereby certified that error appears in the above numbered patent requiring correction and that the said Letters Patent should read as corrected below.

Column 1, lines 67 and 68, for "embodi" read -- embodiment --; column 2, line 38, for "is" read -- in --; column 6, line 23, for "re" read -- are --; column 8, line 23, for "member" read -- portions --.

Signed and sealed this 24th day of August 1965.

(SEAL)
Attest:

ERNEST W. SWIDER
Attesting Officer

EDWARD J. BRENNER
Commissioner of Patents